United States Patent [19]

Haubs et al.

[11] Patent Number: 5,076,916

[45] Date of Patent: Dec. 31, 1991

[54] DEVICE FOR SEPARATING FLUID FROM A FIBER FOLLOWING CONTACT

[75] Inventors: Michael Haubs, Chatham; Walter P. Hassinger, Annandale, both of N.J.

[73] Assignee: Hoechst Celanese Corp., Somerville, N.J.

[21] Appl. No.: 650,550

[22] Filed: Feb. 4, 1991

[51] Int. Cl.[5] .................. B01D 15/00

[52] U.S. Cl. .................. 210/199; 210/200; 210/802; 118/603; 118/610

[58] Field of Search .................. 210/500.23, 799, 800, 210/802, 295, 296, 771, 221.2, 500.28, 500.24; 55/16; 264/DIG. 19, 41, 180; 427/434.3, 434.7, 163, 117; 118/603, 606, 610

[56] References Cited

U.S. PATENT DOCUMENTS

| | | | |
|---|---|---|---|
| 2,456,650 | 12/1948 | Ryan | 427/434.7 |
| 3,940,469 | 2/1975 | Steigelmann et al. | 55/16 |
| 4,431,688 | 2/1984 | Kornmann | 427/434.7 |
| 4,455,159 | 6/1984 | Lamb et al. | 427/163 |
| 4,474,830 | 10/1984 | Taylor | 427/163 |
| 4,704,307 | 11/1987 | Jochem et al. | 427/117 |
| 4,744,932 | 5/1988 | Browne | 264/41 |
| 4,783,348 | 11/1988 | Albrecht et al. | 427/402 |
| 4,820,460 | 4/1989 | Repetti et al. | 210/500.23 |

OTHER PUBLICATIONS

AB-(J63104618) Abstract of Japan, 3104618, 5-10-88.

*Primary Examiner*—Robert A. Dawson
*Assistant Examiner*—Ana M. Fortuna
*Attorney, Agent, or Firm*—M. W. Ferrell

[57] ABSTRACT

A device for separating a moving fiber from processing fluid is disclosed and claimed. A chamber defining hydrophilic and hydrophobic flow paths respectively is exemplified. The device is placed so that substantially all water associated with processing exits via the hydrophilic path while the fiber exits via the hydrophobic path.

17 Claims, 3 Drawing Sheets

DEVICE FOR SEPARATING FLUID FROM A FIBER FOLLOWING CONTACT

FIELD OF THE INVENTION

The present invention relates generally to processes for treating fibers in connection with a bath or fluid and more particularly to a device for separating a fiber from a fluid in such systems.

CROSS REFERENCE TO RELATED APPLICATION

The subject matter of this application is related to that of U.S. patent application Ser. No. 07/582,691 entitled Method and Apparatus for Applying Polymeric Coating filed on Sept. 14, 1990; the disclosure of which is incorporated herein by reference.

BACKGROUND OF INVENTION

In Japanese laid-open application No. 63-104618 of Kawada et al. there is disclosed a method of producing hollow fiber composite membranes. The method shown involves continuously casting a thin film on water and passing microporous hollow fiber through the polymer solution in a region where the polymer/solvent solution possesses fluidity. The solution deposits a thin film on the membrane while excess polymer is taken up and stored. The system utilized by Kawada et al. does not address the issues of depositing a thin film uniformly about the periphery of a hollow fiber as would be required for high quality separation membranes. Moreover, significant control and recycling of polymer would be required, making the system difficult to automate or even produce commercially suitable product.

A superior method of coating fibers is disclosed and claimed in U.S. Ser. No. 07/582,691, noted above, which involves providing a polymer solution to the surface of a liquid bath to form a polymeric film and drawing the fiber therethrough while radially advancing the film to a central point. Especially advantageous operation is achieved by draining the bath at the central point as will be appreciated by reference to the discussion which follows. In processes such as the foregoing, however, it is difficult to separate the fiber from liquid with which it has been associated during processing, and in many cases excess liquid must be evaporated or simply tolerated regardless of the specific processing method employed and may lead to inferior product.

SUMMARY OF INVENTION

It has been found that by constructing a separating device with a relatively low surface energy path for the fluid, that a fiber can be readily separated from excess processing liquids without extraordinary mechanical devices or high thermal energy processing steps. The same is achieved by way of a separator with an inlet for fiber and liquid having a low surface energy exit with respect to the liquid and a high surface energy exit with respect to the liquid where the fiber exits. The liquid is allowed to flow through the low surface energy path while the fiber is drawn through the high surface energy path which naturally repels the liquid. In a typical embodiment, a polymer fiber together with water enters a device constructed in accordance with the invention and the water is allowed to flow along a hydrophilic path while the fiber is drawn through a narrow hydrophobic sleeve. The sleeve may be constructed for example, from polytetrafluoroethylene or like materials.

BRIEF DESCRIPTION OF DRAWINGS

The invention is described in detail below with reference to the figures wherein like numerals designate similar parts and in which.

DETAILED DESCRIPTION

The present invention will now be described with reference to a specific embodiment involving coating a polypropylene fiber with a polyimide polymer coat or layer. It is to be understood, however, that such description is for purposes of exposition and not for purposes of limitation. It will be readily understood that the inventive device is equally applicable to other systems, such as processing fibers through a quenching or surface treatment apparatus.

Figure 1:
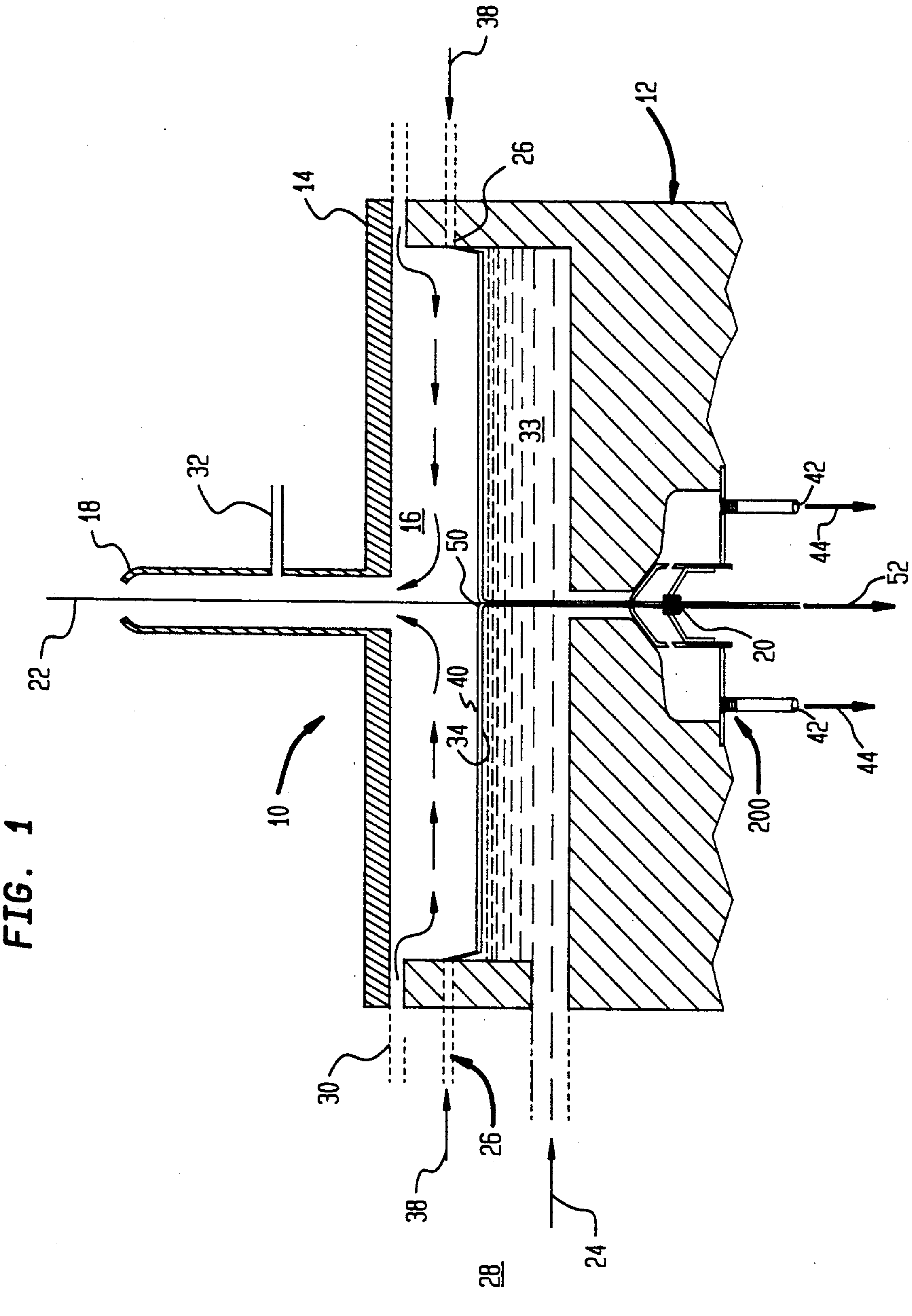
FIG. 1 is a schematic view in section and elevation of an apparatus utilizing the device of the present invention.

An apparatus 10, schematically depicted in FIG. 1, is an apparatus for continuously coating a fiber with a pre-formed film. Apparatus 10 includes a feed roll (not shown) a cylindrical bath container 12 provided with a top portion 14 to define interior plenum chamber 16. There is a fiber inlet 18 at the top and an exit hole 20 below the bath. A fiber 22 enters at 18 and exits hole 20 and is conveyed to a drying area (not shown). Typically, the coated fiber is dried to remove residual solvent as well as drive off any excess liquid from the bath.

Bath container 12 is conveniently provided with a bath liquid inlet 24, and a polymer feed port 26. Preferably, there are four such ports spaced equally about the periphery of the bath to ensure good distribution of polymer solution about the circumference of the bath. Polymer is fed from a reservoir indicated at 28. To achieve desired feed rates it is convenient to use a mechanized syringe-type feeder. There is additionally provided a nitrogen gas inlet 30 and a gas outlet 32.

In operation, a polymer solution is prepared and fed from one or more reservoirs 28 through one or more feed ports 26 onto a surface 34 of a bath 33 as shown in the direction indicated by arrows 38. While any suitable materials may be used, preferred polymers for coatings include polyimides, polyesters, polysulfones, polyetherketones, polycarbonates, polyolefins, polyamides and the like and the fibers to be coated may be the same or a different material. Glassy polyimides and the like are particularly preferred. A variety of organic solvents may be used and it is useful to use a surface active agent in the polymeric solution for purposes of continuous casting and coating. Such agents may be of the various known surfactant types, of the anionic, cationic, polyoxyethylene, semipolar, or zwitterionic class for example, including such compounds as sodium dodecyl sulfate, trimethyl dodecyl ammonium chloride, a condensation product of 1 mole dodecyl alcohol with 10 moles of ethylene oxide, dimethyl dodecyl amine oxide, dimethyl dodecyl ammonium propionate or like compounds. Surface active agents of the polysiloxane type or those with a perfluorinated hydrophobic portion are particularly preferred.

Apparatus 10 may be operated with various feed rates of polymer generally in the range of about 0.05 to about 20 microliters per second; 0.2 to about 3 microliters per second being preferred. The solution employed may be of any suitable concentration such that a film 40 remains in a swollen, low viscosity state as further discussed herein. Generally, this is achieved by using a solution generally of about 0.1 to about 30 weight per cent polymer and typically of from about 1 to about 10 weight per cent polymer at the inception of the process and allowing a partial evaporation of the solvent before the polymeric layer contacts the fiber to be coated. It is important to maintain the polymeric layer in a low viscosity, highly flexible state when it contacts the fiber, but not so dilute that it will wick into the micropores which leads to non-uniform thickness. Preferred concentrations at the inception of the process are from about 2 to 10 weight per cent polymer and most preferably from about 2.5 to about 5 weight per cent polymer.

While film 40 is forming on the bath, liquid flow is initiated, originating at 24 and exiting apparatus 10 at 42 after flowing through a separator portion 200 having a conical area which also defines central hole 20. Flow direction of the liquid is indicated by arrows 44.

As part of the process, water is typically gently added to the bath at 24 and withdrawn at 42 so that centrally located vortex 50 is created as the film is transported to the fiber. The rate of addition of polymer, water circulation and fiber speed are carefully adjusted so that the film is uniform about the circumference of coated fiber and all of the polymer in the film is applied to the fiber.

ILLUSTRATIVE EXAMPLE

A polymer solution was prepared containing 2.5 wt. per cent of a polyimide which is the condensation product of 2,2 bis(4-aminophenyl) hexafluoropropane and 2,2 bis(3,4 -dicarboxyphenyl hexafluoropropane dianhydride (as described in copending application U.S. Ser. No. 462,272 filed Dec. 21, 1989 and published as European Application Publication No. 0355 367 on Feb. 28, 1990) in a 50/50 mixture of 1,2,3-trichloropropane and butyl acetate as the solvent, and $3\times10^{-2}$ weight per cent of Perenol 54 a surface active agent manufactured by Henkel Corp., Amblers, Penna., which is a polysiloxane type of surface active compound, as a processing aid.

In order to coat the fiber, the solution as prepared above and represented by arrows 38 is added to surface 34 of the bath as shown at constant rate of 1 microliter per second by way of a syringe type feeder while simultaneously, fiber 22, a hollow microporous polypropylene fiber was drawn through the polymeric film layer 40 at a rate of 20 cm/sec as shown by arrow 52 and nitrogen is circulated. The microporous fiber employed is marketed by Hoechst-Celanese Corporation, 13800 South Lakes Drive, Charlotte, N.C. 28217.

Figure 2:
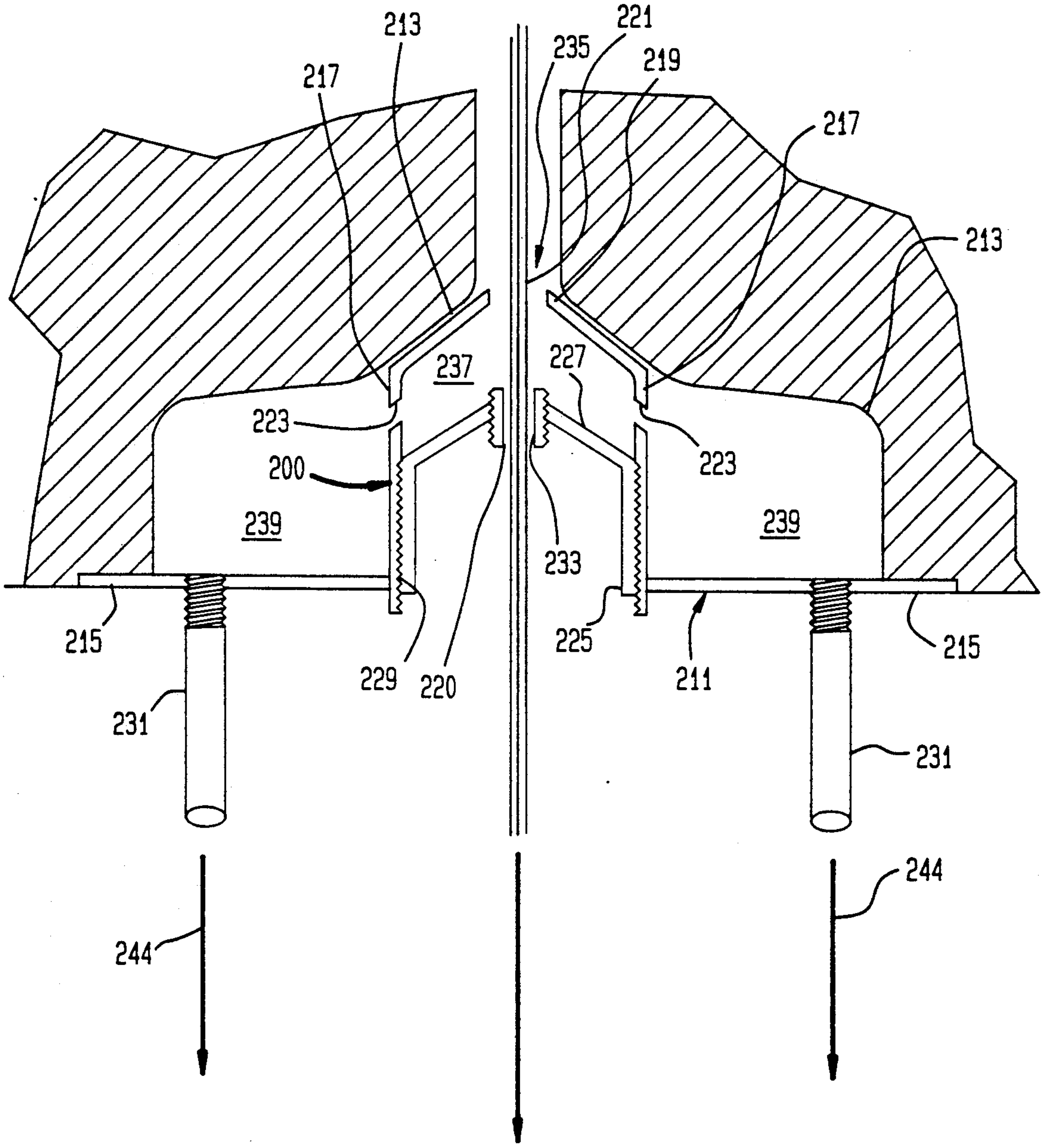
FIG. 2 is a view in section and elevation of a device constructed in accordance with the present invention. Like parts of FIG. 1 are numbered 200 units higher in FIG. 2.

Referring to FIG. 2, separator portion 200 includes a metallic insert 211 within a conical recess 213 in the base of the bath container. Insert 211 may be friction fit into a suitably dimensioned recess and includes a base ring 215 which fits around a cylindrical member 217 provided with a conical cap 219 which mates with recess 213 at apex 221. There are provided a plurality of holes 223 in member 217 to allow fluid to escape as hereinafter described.

Insert 211 is also provided with an inner cylindricial body 225 with cylindricial cap 227. Body 225 is threadedly engaged to member 217 as shown at 229. Base ring 215 is also provided with a pair of drain conduits 231.

All of the parts of insert 211 are made of aluminum treated with sodium hydroxide to make the surfaces hydrophilic; except there is a sleeve insert 233 made of PTFE, a hydrophobic material to separate water from concurrently moving fiber when apparatus 10 of FIG. 1 is operating.

The aluminum parts 211 including parts 215, 217, 225 and 231 are typically made hydrophilic by treatment with a solution of sodium hydroxide at room temperature. Preferably a one per cent solution by weight sodium hydroxide is used for about ten seconds at room temperature. Alternate methods of making a surface hydrophilic include coating with a hydrophilic polymer.

During operation of Apparatus 10 as described hereinabove in the example, a coated fiber having a thickness of 0.5 mm or so exits bath 36 through a central hole 235 having a diameter of about 3 millimeters in insert 211 together with associated water. The fiber typically is traveling at a rate of 10–100 cm per second, while the water may be moving at a linear velocity of 0.5 meter per second or more through hole 235. Interior chamber 237 is preferably at least 3 times the diameter of hole 235 to allow the water to decelerate. The fiber continues through hole 220 defined by hydrophobic sleeve 233 while the water is repelled therefrom and exits chamber 237 through holes 223 and eventually flows through exit pipes 231 after flow through an exterior chamber 239 defined between the walls of cylindrical member 217 and the body of the bath container.

Figure 3:
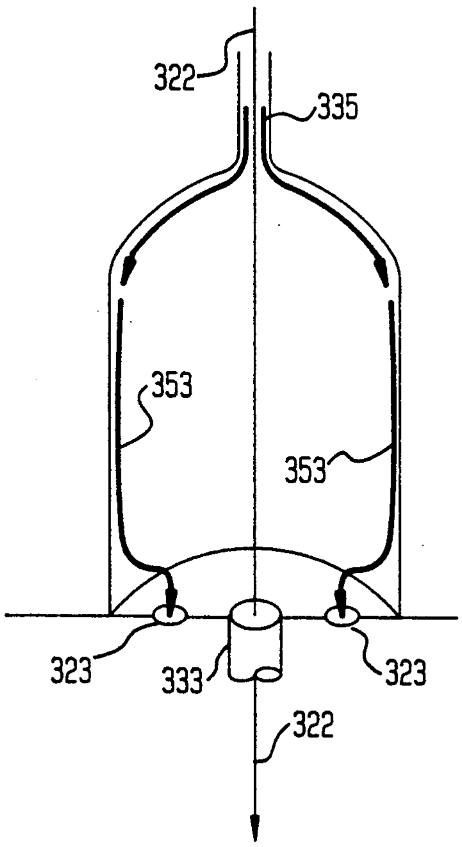
FIG. 3 is a schematic profile of an alternate embodiment of the device of FIG. 2.

Instead of member 217, with a conical cap 219, shapes with more curvature are also suitable for use with liquids, as would be expected from principles of fluid flow. A particularly preferred embodiment of the separator device features a curved, rather than angular, profile of the inventive separator such that the interior has a continuously expanding profile as shown in FIG. 3. In such an embodiment the fiber 322 enters hole 335 together with associated liquid and the fiber alone exits sleeve 333 while the liquid exits holes 323 as indicated by arrows 353. Again, a combination of a hydrophilic path and hydrophobic path is typically achieved via material selection.

While the invention has been described in detail above, various modifications will be readily apparent to those of skill in the art. For instance, instead of hydrophilic/hydrophobic system as described above, any system that employs a relatively low surface energy path that is readily wetable by the fluid could be utilized. Moreover, if so desired, the hydrophilic surface area interior to the separator device could be grooved to increase its surface area and provide an even more compact design. The present invention has the distinct advantage that a fiber may be separated from an associated fluid without contacting the fiber with mechanical means. The present invention is in no way restricted by the foregoing, but is limited and defined only by the appended claims.

We claim:

1. In an apparatus for contacting a moving fiber with a fluid bath having a fluid drain at its lower portion which also acts as an exit for the fiber, a separator device comprising in combination:

(a) means of defining a chamber portion having an inlet for receiving both said moving fiber and said fluid wherein said inlet communicates with the interior of said chamber;

(b) a first outlet for said fluid communicating with the interior of said chamber; and (c) a second outlet for said fiber communicating with the interior of said chamber wherein said first outlet defines a flow path having a relatively low surface energy with respect to said fluid and said second outlet includes a conduit having a relatively high surface energy with respect to said fluid and wherein said chamber inlet, and outlet are constructed and arranged so that the geometries and relative surface energies cooperate to ensure substantially all of the fluid exits said separator device through said first outlet means during operation of said apparatus.

2. The device according to claim 1, wherein said first outlet includes a hydrophilic material and said second outlet includes hydrophobic material.

3. The device according to claim 2, wherein said first outlet comprises a metal rendered hydrophilic.

4. The device according to claim 3, wherein said metal is aluminum treated with sodium hydroxide.

5. The device according to claim 3, wherein said metal is is coated with a hydrophilic polymer.

6. The device according to claim 1, wherein said second outlet comprises an organic hydrophobic polymer.

7. The device according to claim 6, wherein said polymer is selected from the group consisting of polyvinyl, polyester, polyimide, nylon and acetal polymers.

8. The device according to claim 7, wherein said polymer is polytetrafluoroethylene.

9. A device for separating a moving fiber from concurrently flowing water comprising a barrel portion with an interior communicating with an inlet for receiving both said fiber and water; and means for defining a first hydrophilic exit path for the water and means for defining a second, hydrophobic exit for said fiber wherein said barrel portion and means for defining said first and second exits are positioned, configured and dimensioned to cooperate so that substantially all of said concurrently flowing water exits the interior of the barrel portion via said first hydrophilic exit path.

10. The device according to claim 9, wherein said means for defining the hydrophilic exit path include a metal rendered hydrophilic.

11. The device according to claim 10, where said metal is aluminum treated with sodium hydroxide.

12. The device according to claim 10, wherein said metal is coated with a hydrophilic polymer.

13. The device according to claim 9, wherein said means for defining the hydrophobic exit path include at least a portion made from a hydrophobic organic polymer.

14. The device according to claim 13, wherein said polymer is selected from the group consisting of polyester, polyacetal, polyimide, nylon and polyvinyl polymers.

15. The device according to claim 8, wherein said barrel is made of a hydrophilic material and is cylindrical with a cap portion and said inlet comprises a hole along the axis of said cylinder in said cap portion.

16. The device according to claim 13, wherein said first exit path includes at least one hole in the wall of said cylinder.

17. The device according to claim 8, wherein said second exit path includes a cylindrical sleeve made up of a hydrophobic material.

* * * * *